Sept. 26, 1950  R. J. MILLER  2,523,584
TAP CHUCK WITH OVERLOAD COUPLING
Filed May 18, 1949
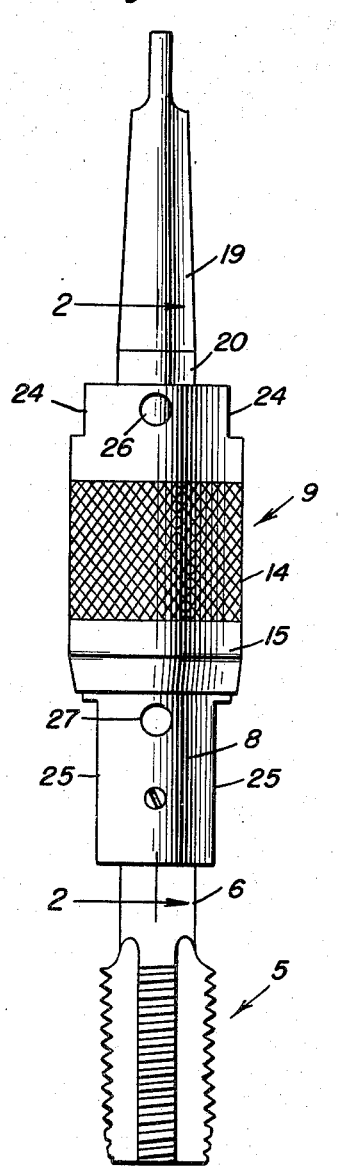
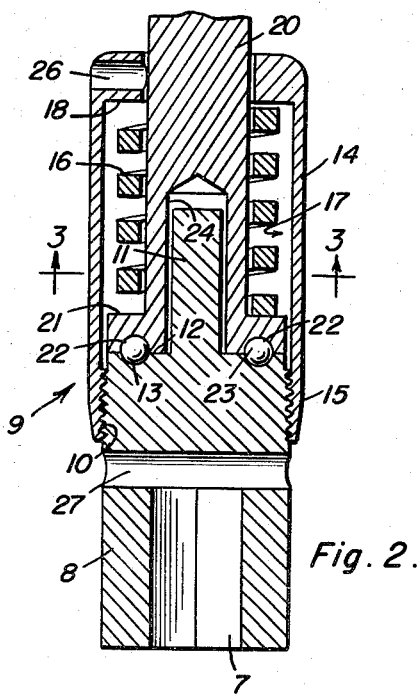
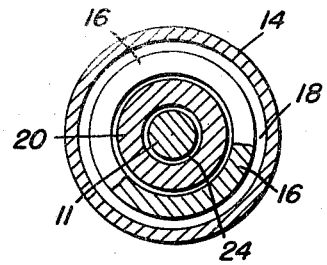
Inventor
Raymond J. Miller
By *Clarence A. O'Brien*
and *Harvey B. Jacobson*
Attorneys Patented Sept. 26, 1950

2,523,584

UNITED STATES PATENT OFFICE 2,523,584

TAP CHUCK WITH OVERLOAD COUPLING

Raymond J. Miller, Corry, Pa.

Application May 18, 1949, Serial No. 93,961

1 Claim. (Cl. 279—1)

The present invention relates to a tap holding and driving chuck which has incorporated therein a safety-type overload coupling, a portion of said coupling also functioning as a taper-shank which is driven by a suitable source of power.

The obvious object and purpose of the invention is to automatically uncouple the tap from the chuck, or vice versa, so as to automatically protect the respective parts from breakage when an excessive or abnormal load is imposed on the stated chuck.

More particularly, novelty is predicated upon a spring-pressed overrunning clutch functioning as the automatic coupling, said clutch providing the new feature of the chuck.

Briefly described, the clutch is characterized by a socket member threaded into one end of a complemental spring casing, said socket member having an axial extension projecting telescopically into an axial recess in one end portion of the taper-shank, a coiled spring in the casing surrounding the coacting end portion of the taper-shank, the latter being flanged to provide one of the accompanying members, said coupling member being opposed to the socket member and the two having ball seats or depressions therein to accommodate the motion-transmitting balls.

No doubt, the art to which the invention relates is characterized by pipe and rod couplings and the idea of incorporating therein an overrunning clutch is perhaps not new. It is believed that by utilizing one end of a socket member as one coupling element, the flange on a taper-shank as the opposed coupling element, and balls between the two elements wherein all parts are of simplified construction and arrangement constitutes a novel so-called tap-holding and driving chuck.

Other objects, features and advantages will become more readily apparent from the following description and the accompanying drawings.

In the sheet of drawings, wherein like numerals are employed to designate like parts throughout the several figures:

Figure 1 is an elevational view of a tap-accommodating and holding chuck constructed in accordance with the principles of the present invention.

Figure 2 is a view upon a slightly enlarged scale showing the details which go to make up the chuck with the safety coupling feature.

Figure 3 is a cross-section on the horizontal line 3—3 of Figure 2, looking in the direction of the indicating arrows.

Referring now to the drawings by reference numerals and accompanying lead lines, the tap, which is a conventional part, is denoted by the numeral 5 and includes a shank 6 having a polygonal portion corresponding with and adapted to fit into a correspondingly shaped socket 7 in the socket member 8. The socket member 8, which constitutes one of the essential units of the overall chuck, is denoted in a unitary way by the numeral 9. One end portion of the socket member is screw-threaded, as at 10, and the same end portion has a reduced cylindrical guiding and assembling stem or stud 11. The end portion 12 of the socket member constitutes one of the coupling elements and has circumferentially spaced, equidistant, semispherical, ball seats 13.

Another important part of the chuck is the casing member 14 which is of cylindrical or sleeve-like form and has a skirt portion 15 which is internally screw-threaded and screwed to the threads 10. This provides an adjusting and housing unit for the coiled tensioning spring 16, said spring being in the spring chamber 17. The outer or closed end portion of the casing provides a shoulder 18 for the endmost coil of the spring. The next, and a significant part of the chuck, is the taper-shank member or unit 19. This has a cylindrical portion 20 which projects through an opening in the casing 14 and which terminates in a flange 21 which is opposed in parallelism to the surface 12 whereby to form the other coupling element. This flange has semi-spherical recesses 22 providing additional seats for the coacting half-portions of the jointing or coupling balls 23. To add to the stability, the cylindrical portion 20 has an axial socket 24 for telescopic and rotatable reception of the coacting stem 11. Thus, we have a socket member 8 provided with a socket 7 on one end and a reduced axial stem 11 on the opposite end, said stem extending into a socket 24 to axially join the two main members 20 and 8 in driving relationship. Novelty is predicated, however, upon a simple casing 14 adjustably threaded on the socket member 8 to tension the spring 16 which is housed in the chamber 17 of the casing and to enable the simple flange 21 and surface 12 to come together in coupling relationship and to accommodate the overrunning coupling balls 23. Normally, the shank 19 and socket member 8 are coupled and turned together, whereby to provide a driving structure for the driven tap 5. In case an excessive overload is encountered while the tap is being driven from a suitable source of power, by way of my improved chuck, the latter automatically provides the safety cut-out achievement. That is to say, the coupling functions as a well known type of overrunning clutch, and disruptable damage to the parts is thus overcome.

I am not unmindful that overrunning clutches have been used in so-called torsional wrenches. I know of none which, however, include the specific details 8, 11, 14, coupling members 12 and 21, with 21 constituting a spring-pressed flange whose pressure may be regulated in the manner evident from my drawings.

In actual practice, the upper end portion of casing member 14 is provided, if desired, with diametrically opposite flat surfaces 24—24 which constitute wrench-grips. Also, and here again it is optional, the socket member is provided with diametrically opposite flat faces 25—25 which serve as additional wrench grips. This makes it possible to place a wrench securely on the parts 8 and 14, respectively, to hold them for purposes of adjusting same and regulating the tension of the spring 16. If preferred and instead of using wrench grips 24 and 25, the parts 14 and 8 may be provided in diametrically opposite sides with holes 26 and 27, respectively, to accommodate an insertable and removable rod which may be used as a turning handle (not shown). This makes it possible to provide parts 8 and 14 with surfaces 25 and 24 or 27 and 26, whichever is preferred, or both features may be used if such is the decision of the manufacturer.

It is also clear that by changing the setting and size of the balls and the seats in which the balls are fitted, this changes the interference angle and thus effects the beginning of the slip or release action the moment an overload of abnormal force occurs.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A tap holding and rotating chuck of the class shown and described comprising a socket member having an axial socket for removable reception of the shank portion of a tap, said socket member being axially reduced at one end and provided with a cylindrical axial stem, the portion surrounding said stem providing a torque responsive friction coupling element, the latter being provided with circumferentially arranged ball seats, a taper-shank having an axial socket at one end, said stem extending telescopically and rotatably into said socket and further having, at the same end, a flange of a diameter corresponding to the diameter of the socket member, said flange providing a second torque responsive friction coupling element and one surface of the latter having circumferentially spaced ball seats, coupling balls interposed between said coupling elements and fitting into the respective seats provided therein, a coiled spring surrounding the flanged end of said taper shank, and a casing enclosing said spring, said socket member being provided with external screw-threads, said casing having internal screw-threads screwed upon the first-named screw-threads to permit the tension of said spring to be regulated and to thus control the setting of the safety phase of the coupling.

RAYMOND J. MILLER.

REFERENCES CITED

The following references are of record in the file of this patent:

UNITED STATES PATENTS

| Number | Name | Date |
| --- | --- | --- |
| 1,196,839 | Bodene | Sept. 5, 1916 |
| 1,463,497 | Bugatti | July 31, 1923 |
| 1,697,595 | Henderson | Jan. 1, 1929 |
| 2,446,363 | Daum | Aug. 3, 1948 |